May 15, 1923.  1,455,426
C. D. CHARLES
CIRCULAR SAW MACHINE
Filed Dec. 8, 1921  2 Sheets-Sheet 1
FIG_1_
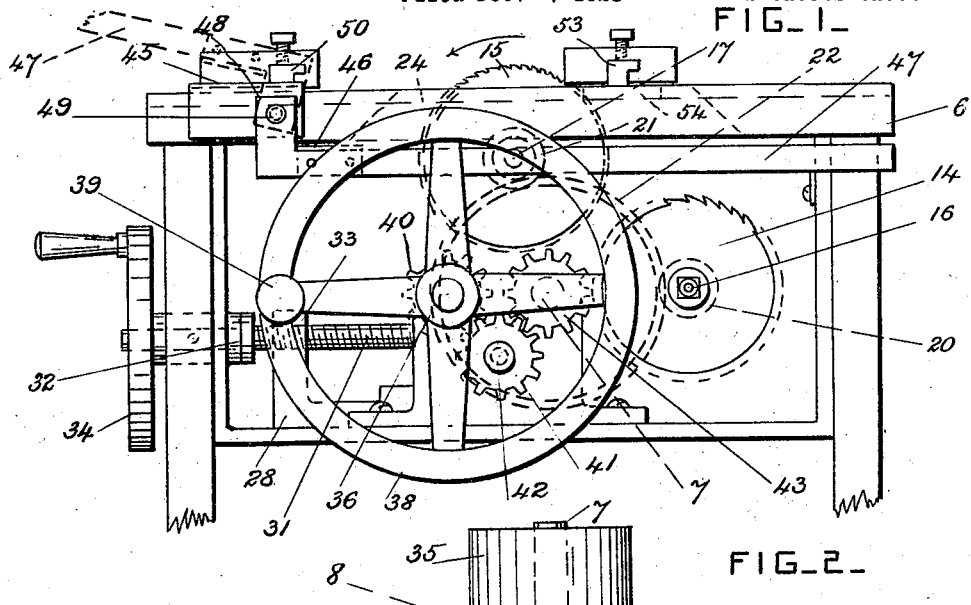
FIG_2_
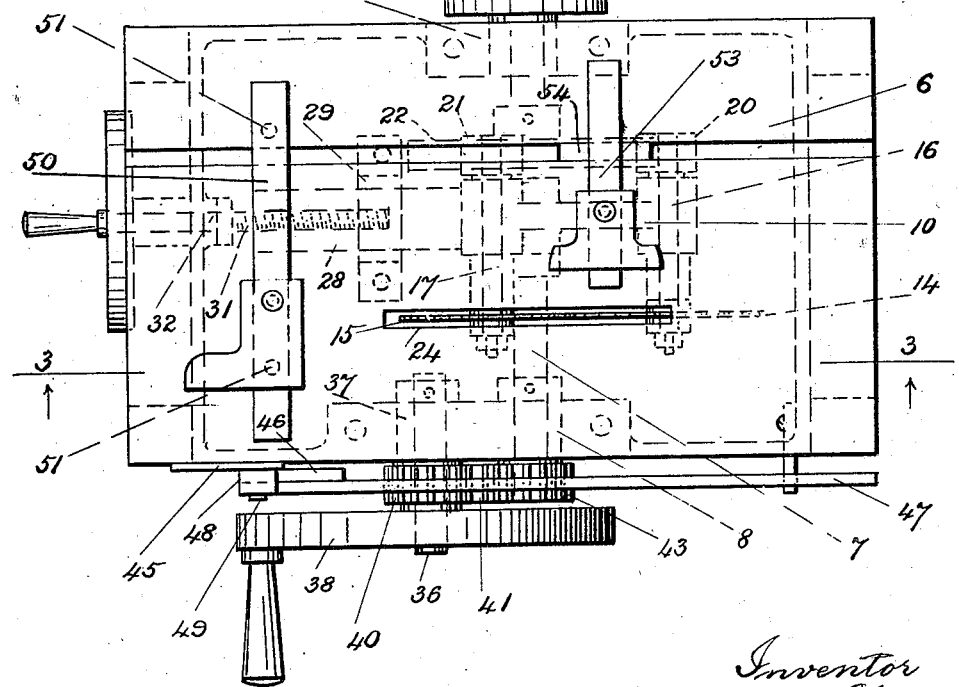
Inventor
Clement D. Charles
by Herbert W. Jenner.
Attorney May 15, 1923.
C. D. CHARLES
CIRCULAR SAW MACHINE
Filed Dec. 8, 1921
1,455,426
2 Sheets-Sheet 2
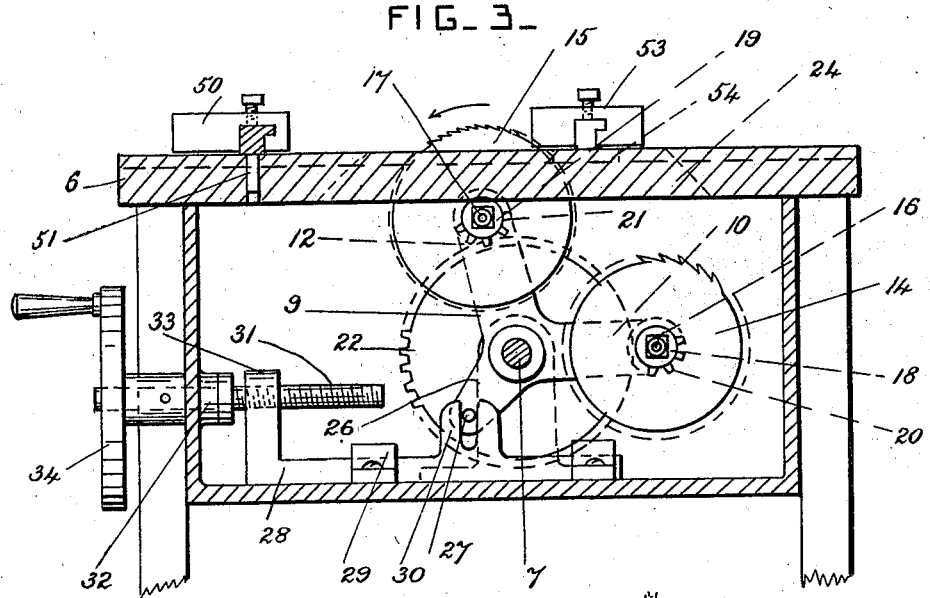
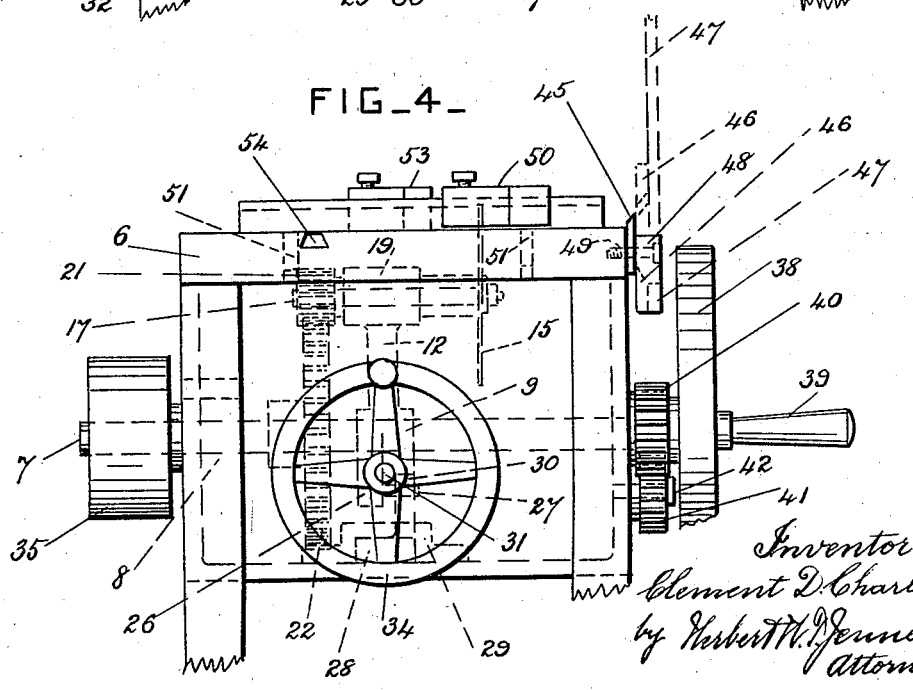

Patented May 15, 1923.

1,455,426

UNITED STATES PATENT OFFICE.

CLEMENT D. CHARLES, OF NEW YORK, N. Y.

CIRCULAR-SAW MACHINE.

Application filed December 8, 1921. Serial No. 520,973.

*To all whom it may concern:*

Be it known that I, CLEMENT D. CHARLES, a citizen of the United States, residing at the city of New York, in the State of New York, have invented certain new and useful Improvements in Circular-Saw Machines, of which the following is a specification.

This invention relates chiefly to circular-saw machines in which two saws are provided and are adapted to be used alternately; and it consists in the novel construction and combination of the parts hereinafter fully described and claimed whereby a machine is provided which is specially adapted for cutting the metal slugs used on linotype machines, electrotypes and stereotypes, but which may be used for other purposes.

In the drawings, Figure 1 is a side view of a machine constructed according to this invention. Fig. 2 is a plan view of the same. Fig. 3 is a section through the machine, taken on the line 3—3 in Fig. 2. Fig. 4 is a front view of the machine.

A work table 6 is provided, and is arranged to support certain circular saws which are used to cut metal slugs such as used on linotype machines, when a number of slugs are to be cut simultaneously. The table also supports a pivoted cutter which is used alternately of the saws when single slugs require to be cut or trimmed.

A main shaft 7 is provided, and is journaled in bearings 8, and is arranged crosswise under the table. A bell-crank lever 9 is pivoted on this shaft, and has two arms 10 and 12 arranged substantially at a right angle to each other. Two saws 14 and 15 are provided, and are mounted on shafts 16 and 17 which are journaled in bearings 18 and 19 on the arms 10 and 12. The shafts 16 and 17 have also toothed pinions 20 and 21 secured on them, and the main shaft 7 has a toothed wheel 22 secured on it and gearing into the toothed pinions 20 and 21, so that the two saws are revolved simultaneously in the same direction.

These saws are arranged to project alternately through a slot 24 in the table. The bell-crank lever 9 has an operating member 26 which projects intermediate of the arms 10 and 12, and this member 26 has a pin 27 which projects laterally from its free end portion. A slide 28 is slidable in a guide 29 under the table top, and it has a forked bracket 30 which engages with the pin 27. The slide 28 is operated by means of a screw 31 which is journaled in a bearing 32 on the front part of the table, and which engages with a screwthreaded hole in a lug 33 on the slide. The screw is provided with a hand wheel 34 for revolving it, arranged at the front side of the table.

The saws may be revolved by power applied to a belt pulley 35 secured on the main shaft 7 and arranged at one side of the machine. The saws may also be revolved by hand, and for this purpose a shaft 36 is provided and is journaled in a bearing 37 under the table top. A hand wheel 38 provided with a crank handle 39 is secured on the shaft 36, and is arranged so that it can be worked by a man standing at the front of the machine. A toothed wheel 40 is secured on the shaft 36, and gears into an idle toothed wheel 41 mounted on a pin 42, and this idle wheel 41 gears into a toothed wheel 43 secured on the main shaft 7, and arranged at the opposite end of it from the belt pulley 35.

The two saws have teeth of different pitch, and are adapted to cut a number of slugs simultaneously, but they are used selectively and according to the work required to be cut.

When single slugs are to be cut, it is preferable to use shear blades 45 and 46. The blade 45 is secured to the table top at one side thereof, and the blade 46 is secured to a lever 47. The lever 47 has a lateral extension 48 at one end, which is pivoted to the stationary blade 45 by a pin 49. When the shear blade 46 is to be used it is raised to the position shown in dotted lines, and when the circular saws are in use the lever rests below the surface of the table top in the position shown in full lines. The shear blades have a gage 50 for the work, which is of any approved construction, and which has pins 51 on its underside, which are dropped into holes in the table top. This gage 50 is removed when the saws are in use. The saws have also a gage 53 of approved construction which is connected to the saw table by a slide part 54, and which can be removed when the saws are not in use.

All the slugs used in a linotype or similar machine can be cut by a single operator on the table of this machine without moving away from it or changing his position at the front side of it.

What I claim is:

1. The combination, with a supporting table provided with a slot, of a bell-crank lever pivoted to a non-slidable support below the table top, two circular saws journaled in the arms of the bell-crank lever, means for moving the bell-crank lever to project the saws alternately through the said slot, toothed pinions which revolve the said saws, a toothed wheel journaled on the axis of the bell-crank lever and gearing into the said pinions, and means for revolving the said toothed wheel.

2. The combination, with a supporting table provided with a slot, of a bell-crank lever pivoted below the table top and provided with an operating member having a laterally projecting pin, a slide supported by the table and provided with a forked bracket which engages with the said pin, an operating screw journaled in the table and engaging with the said slide, two circular saws journaled in the arms of the bell-crank lever and adapted to be projected alternately through the said slot, and means for revolving the saws continuously in the same direction.

In testimony whereof I have affixed my signature.

CLEMENT D. CHARLES.